United States Patent
Hotta et al.

(10) Patent No.: US 12,320,886 B2
(45) Date of Patent: Jun. 3, 2025

(54) AXIAL DISPLACEMENT ESTIMATION DEVICE

(71) Applicants: DENSO CORPORATION, Kariya (JP); TOYOTA JIDOSHA KABUSHIKI KAISHA, Toyota (JP)

(72) Inventors: Hiroyuki Hotta, Kariya (JP); Koichi Sato, Kariya (JP); Hiroto Nakatani, Kariya (JP); Yuuji Katou, Kariya (JP); Ichiro Aizawa, Toyota (JP); Naoki Sugimoto, Toyota (JP); Takahiro Kohara, Toyota (JP)

(73) Assignees: DENSO CORPORATION, Kariya (JP); TOYOTA JIDOSHA KABUSHIKI KAISHA, Toyota (JP)

(*) Notice: Subject to any disclaimer, the term of this patent is extended or adjusted under 35 U.S.C. 154(b) by 391 days.

(21) Appl. No.: 18/054,847

(22) Filed: Nov. 11, 2022

(65) Prior Publication Data

US 2023/0074625 A1  Mar. 9, 2023

Related U.S. Application Data

(63) Continuation of application No. PCT/JP2021/018480, filed on May 14, 2021.

(30) Foreign Application Priority Data

May 15, 2020  (JP) .................... 2020-085974

(51) Int. Cl.
   *G01S 13/58* (2006.01)
   *G01S 7/40* (2006.01)
   *G01S 13/931* (2020.01)

(52) U.S. Cl.
   CPC ............ *G01S 13/58* (2013.01); *G01S 7/4026* (2013.01); *G01S 13/931* (2013.01)

(58) Field of Classification Search
   CPC ...... G01S 13/58; G01S 13/931; G01S 7/4026; G01S 7/403; G01S 7/4034
   See application file for complete search history.

(56) References Cited

U.S. PATENT DOCUMENTS 6,587,074 B1 * 7/2003 Winter .................. G01S 13/931
                                                                342/128
10,855,328 B1 * 12/2020 Gulati .................. G01S 7/0234
(Continued)

FOREIGN PATENT DOCUMENTS

JP   2016-042288 A   3/2016

*Primary Examiner* — Peter M Bythrow
(74) *Attorney, Agent, or Firm* — Maschoff Brennan

(57) ABSTRACT

An axial displacement estimation device estimates an axial displacement angle of a radar apparatus mounted on a mobile body. The axial displacement estimation device uses a plurality of detection values acquired by mutually different plurality of modulation methods to estimate an axial displacement angle for each of the plurality of modulation methods. The axial displacement estimation device determines whether a predetermined allowable condition is met based on a plurality of axial displacement angle estimation results estimated using a plurality of detection values corresponding to respective plurality of modulation methods. The axial displacement estimation device utilizes at least one of a plurality of axial displacement angle estimation results when determined that the predetermined allowable condition is met.

3 Claims, 12 Drawing Sheets

(56) References Cited

U.S. PATENT DOCUMENTS

| | | | |
|---|---|---|---|
| 10,914,831 B2* | 2/2021 | Buddendick | G01S 13/584 |
| 11,016,174 B2* | 5/2021 | Campbell | G01S 13/931 |
| 2012/0242531 A1* | 9/2012 | Itoh | G01S 7/4056 |
| | | | 342/107 |
| 2013/0106646 A1* | 5/2013 | Kitagawa | G01S 13/931 |
| | | | 342/87 |
| 2013/0135140 A1* | 5/2013 | Kishigami | G01S 13/582 |
| | | | 342/202 |
| 2013/0249731 A1* | 9/2013 | Kurono | G01S 7/412 |
| | | | 342/146 |
| 2016/0036124 A1* | 2/2016 | Schoor | G01S 13/345 |
| | | | 342/81 |
| 2016/0104946 A1* | 4/2016 | Natsume | G01S 13/931 |
| | | | 342/88 |
| 2016/0161597 A1* | 6/2016 | Treptow | G01S 13/424 |
| | | | 342/174 |
| 2016/0349356 A1* | 12/2016 | Takaki | G01S 13/931 |
| 2017/0262716 A1* | 9/2017 | Matsumoto | G08G 1/166 |
| 2017/0363736 A1* | 12/2017 | Kaino | G01S 13/931 |
| 2018/0120416 A1* | 5/2018 | Kitamura | G01S 7/415 |
| 2018/0156892 A1* | 6/2018 | Villeval | G01S 13/931 |
| 2019/0025405 A1* | 1/2019 | Liu | G01S 7/4026 |
| 2020/0033444 A1* | 1/2020 | Marsch | G01S 13/931 |
| 2020/0072941 A1* | 3/2020 | Jansen | G01S 13/343 |
| 2020/0142027 A1* | 5/2020 | Lee | G01S 7/4086 |
| 2020/0363522 A1* | 11/2020 | Ishikawa | G01S 7/403 |
| 2021/0149037 A1* | 5/2021 | Choi | G01S 13/34 |
| 2021/0156992 A1* | 5/2021 | Nishikido | G01S 7/4008 |
| 2022/0146625 A1* | 5/2022 | Nishikido | G01S 7/4091 |

* cited by examiner

AXIAL DISPLACEMENT ESTIMATION DEVICE

CROSS-REFERENCE TO RELATED APPLICATIONS

This application is the U.S. bypass application of International Application No. PCT/JP2021/018480 filed on May 14, 2021, which designated the U.S. and claims priority to Japanese Patent Application No. 2020-85974 filed on May 15, 2020, the contents of both of these are incorporated herein by reference.

BACKGROUND

Technical Field

The present disclosure relates to an axial displacement estimation device that estimates an angle of an axial displacement of a radar apparatus.

Description of the Related Art

An example of an object recognition apparatus determines an axial displacement of a radar apparatus based on an object detection result of an imaging apparatus and a radar apparatus. As a result of inventor's detailed research, according to the object recognition apparatus of the above example, a problem arises that an imaging apparatus is additionally required to determine an axial displacement of a radar apparatus.

SUMMARY

One aspect of the present disclosure provides an axial displacement device that estimates an axial displacement angle of a radar apparatus mounted on a mobile body, including an estimation unit, a utilization determination unit and a utilization unit.

DETAILED DESCRIPTION OF THE PREFERRED EMBODIMENTS

As a conventional art, JP-A-2016-42288 discloses an object recognition apparatus that determines an axial displacement of a radar apparatus based on an object detection result of an imaging apparatus and a radar apparatus.

As a result of inventor's detailed research, according to the object recognition apparatus disclosed in the above-mentioned patent literature, a problem arises that an imaging apparatus is additionally required to determine an axial displacement of a radar apparatus. The present disclosure simplifies configuration of a device for estimating an axial displacement.

Hereinafter, with reference to the drawings, embodiments of the present disclosure will be described.

A radar apparatus 1 according to the present embodiment is mounted to a vehicle such as four-wheel vehicles and detects various objects existing around the vehicle. In the following, a vehicle provided with the radar apparatus mounted thereof is referred to an own vehicle.

Figure 1:
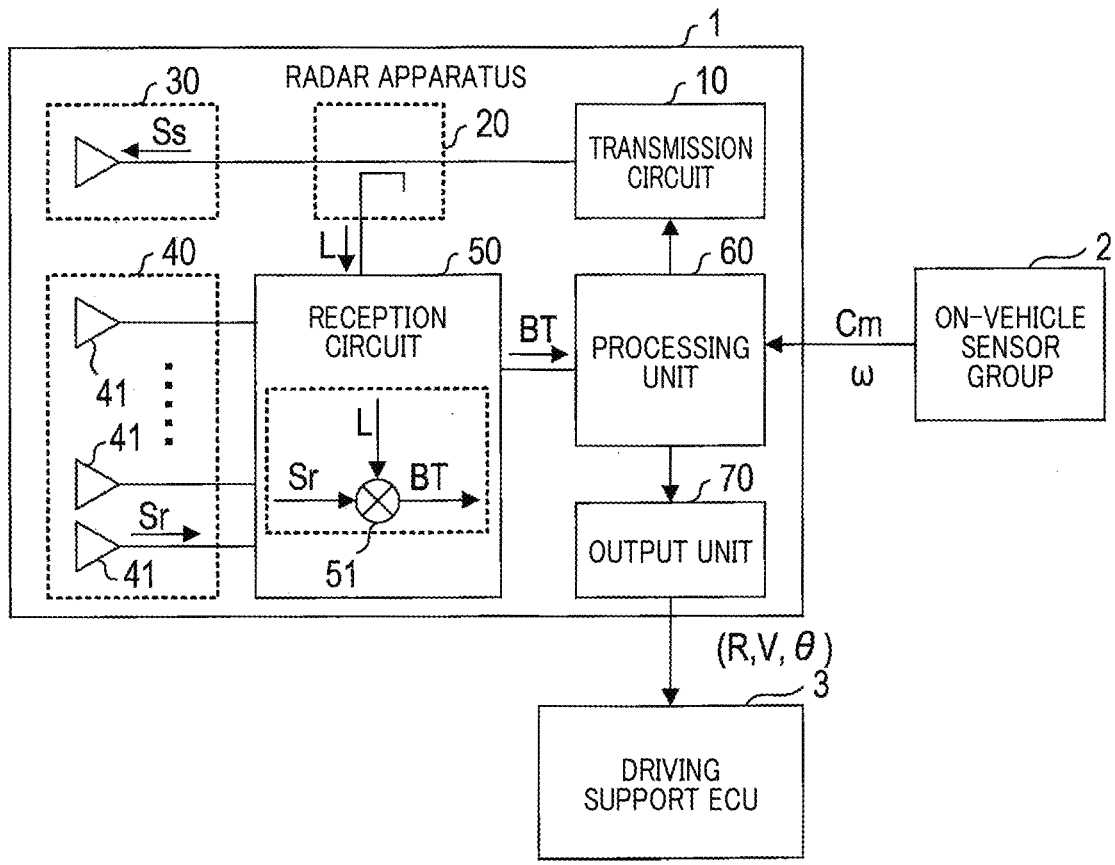
FIG. 1 is a block diagram showing a configuration of a radar apparatus.

The radar apparatus 1 transmits radar waves ahead of the own vehicle and receives reflected radar waves, thereby detecting a distance R to the object which reflected the radar waves, a relative speed V between the own vehicle and the object, and an azimuth θ with which the object is present. As shown in FIG. 1, the radar apparatus 1 outputs the detection values (R, V, θ) to a driving support ECU 3.

The driving support ECU 3 executes, based on the detection values (R, V, θ) of respective objects transmitted from the radar apparatus 1, processes for supporting driving of the vehicle by the driver.

The radar apparatus 1 is provided with a transmission circuit 10, a distributor 20, a transmission antenna 30, a reception antenna 40, a reception circuit 50, a processing unit 60 and an output unit 70.

Figure 2:
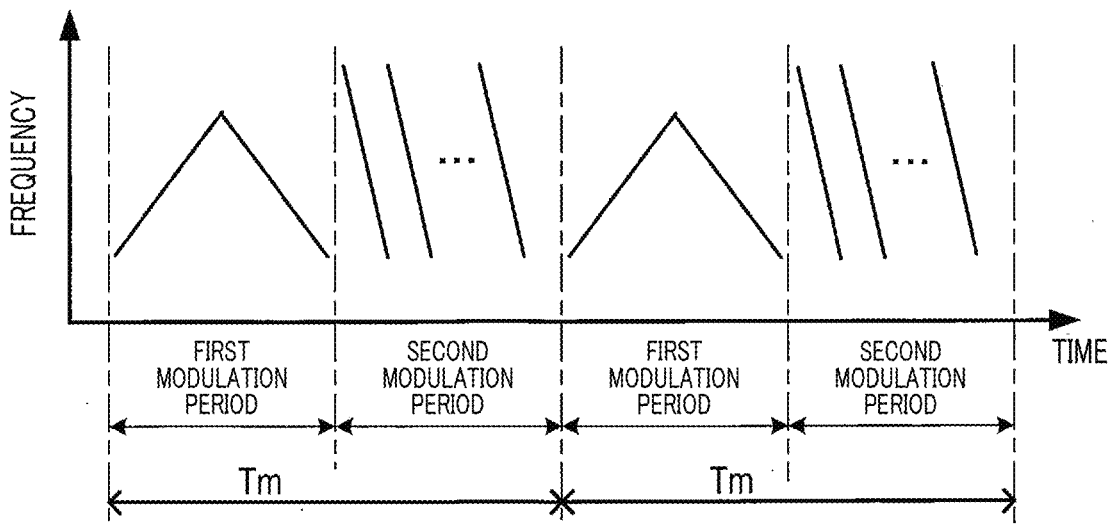
FIG. 2 is a diagram showing a modulation method of radar waves.

The transmission circuit 10 supplies a transmission signal Ss to the transmission antenna 30. The transmission circuit 10 outputs a millimeter-wave band high frequency signal to the distributor 20 positioned in the upper stream side of the transmission antenna 20. Specifically, as shown in FIG. 2, the transmission circuit 10 repeatedly performs a first modulation period and a second modulation period. In the first modulation period, a frequency-modulated high frequency signal (hereinafter referred to as up-down chirp) is generated where the frequency increases in an up-chirp and decreases in a down chirp. In the second modulation period, a high frequency signal composed of a plurality of chirp signals (hereinafter referred to as chirp wave group) is generated.

The transmission circuit outputs the generated high frequency signals to the distributor 20.

In other words, the radar apparatus 1 operates as an up-down chirp radar in the first modulation period in which up-down chirp signal is transmitted and received in the first modulation period, and operates as a chirp wave group radar in the second modulation period in which the chirp wave group signal is transmitted and received.

The measurement as the up-down chirp radar and the measurement as the chirp wave group radar are executed at every time when the measurement period Tm elapses.

Note that, in the second modulation period, the frequency change rate is set such that the frequency of the beat signal generated with the reflected waves from an object located at a predetermined distance away from the own vehicle, becomes a value sufficient to omit the Doppler frequency corresponds to the detection upper limit value of the relative speed. Further, in the second modulation period, the frequency change rate is set so as to uniquely identify the speed through the entire detection range of the relative speed.

As shown in FIG. 1, the distributor 20 power-distributes the high frequency signal transmitted from the transmission circuit 1 into the transmission signal Ss and the local signal L.

The transmission antenna 30 radiates, based on the transmission signal Ss supplied from the distributor 20, radar waves having a frequency corresponding to the transmission signal Ss, ahead of the own vehicle. The transmission antenna 30 may be configured of a plurality of antennas.

The reception antenna 40 is for receiving the radar waves reflected at an object (hereinafter referred to as reflected waves). The reception antenna 40 is provided with a plurality of antenna elements 41. The reception antenna 40 is installed such that the center axis of the detection range of the reception antenna 40 corresponds to the travelling direction of the own vehicle. The reception signal Sr of the reflected waves received by the respective antenna elements 41 is transmitted to the reception circuit 50.

The reception circuit 50 processes the reception signal Sr transmitted from the respective antennal elements 41 that constitute the reception antenna 40 and outputs the beat signal BT for each antenna element 41. Specifically, the reception circuit 50 mixes the reception signals Sr transmitted from respective antenna elements 40 and the local signal L transmitted from the distributor 20 by using the mixer 51, thereby generating the beat signal BT for each antenna element 41 and outputs them.

However, processes for outputting the beat signal BT includes a process for amplifying the reception signal Sr, a process for eliminating unnecessary signal component from the beat signal BT, and a process for converting the beat signal BT to the digital data. Thus, the reception circuit 50 converts the beat signal BT for each antenna element 41 to the digital data and outputs them. The outputted beat signal BT for each antenna element 41 is transmitted to the processing unit 60. Hereinafter, an A/D conversion data of the beat signal acquired in the first modulation period is referred to as a first modulation data, an A/D conversion data of the beat signal acquired in the second modulation data is referred to as a second modulation data.

The processing unit 60 is an electronic control unit 60 configured mainly of a microprocessor provided with a coprocessor that executes fast Fourier transformation in addition to CPU, ROM and RAM.

Various functions of the microprocessor are accomplished when the CPU executes programs stored in a non-transitory tangible recording media. In this example, the ROM corresponds to the non-transitory tangible recording media. Further, when executing the program, methods corresponding to the program is executed. Note that, a part of or all of functions executed by the CPU may be configured as hardware circuit such as a single IC or a plurality of ICs. The number of microprocessors that constitute the processing unit 60 may be one or more.

The processing unit 60 analyzes the beat signal BT for each antenna element 41, thereby executing an object detecting process that calculates detection values (R, V, θ) for each object that reflected radar waves.

For the processing unit 60, various detection signals are inputted from the on-vehicle sensor group 2. The on-vehicle sensor group 2 is composed of various sensors mounted on the vehicle to detect state of the vehicle. The on-vehicle sensor group 2 includes a vehicle speed sensor that detects a vehicle speed and a yaw rate sensor that detects a yaw rate. The vehicle speed sensor outputs vehicle speed information indicating the detected vehicle speed Cm. The yaw rate sensor outputs yaw rate information indicating detected yaw rate ω. Hereinafter, the vehicle speed information and the yaw rate information are referred to as odometry information.

The output unit 70 outputs the detection values (R, V, θ) calculated by the processing unit 60 to the driving support ECU 3.

The up-down chirp radar according to the present embodiment is designed for a long-distance measurement capable of measuring an object existing in a far distance from the own vehicle. The chirp the chirp wave group radar according to the present embodiment is designed for a short-distance measurement capable of measuring an object existing in a short distance from the own vehicle.

According to the present embodiment, specifically, a modulation band width of the chirp wave group radar is set to be the same as the modulation band width of the up-down chirp radar or to be larger than the modulation band width of the up-down chirp radar. This is because, assuming that the modulation periods are the same, since the wider the modulation band width, the larger a change in the frequency of the beat signal per unit time and the shorter a change in the distance corresponding to the unit frequency, the resolution of the distance is improved.

The sampling rate of the AD converter for converting the beat signal BT to the digital data may be utilized for setting the up-down chirp radar to be for a long distance measurement and for setting the chirp wave group radar to be a short distance measurement. When the sampling rate of the AD converter is higher, higher frequency of beat signal can be detected to detect longer distance. Specifically, the sampling rate of the up-down chirp radar may be set to be higher than the sampling rate of the AD converter of the chirp wave group radar.

Further, the modulation period may be set such that the up-down chirp radar is used for a long distance measurement and the chirp wave group radar is used for a short distance measurement. The longer the modulation period, the lower the frequency of the beat signal that can be detected, thereby detecting short distance. The modulation period of the chirp wave group radar may be set to be longer than the modulation period of the up-down chirp radar.

Next, the procedure of an object detecting process executed by the processing unit 60 will be described. The object detecting process is repeatedly executed when the processing unit 60 is in operation.

Figure 3:
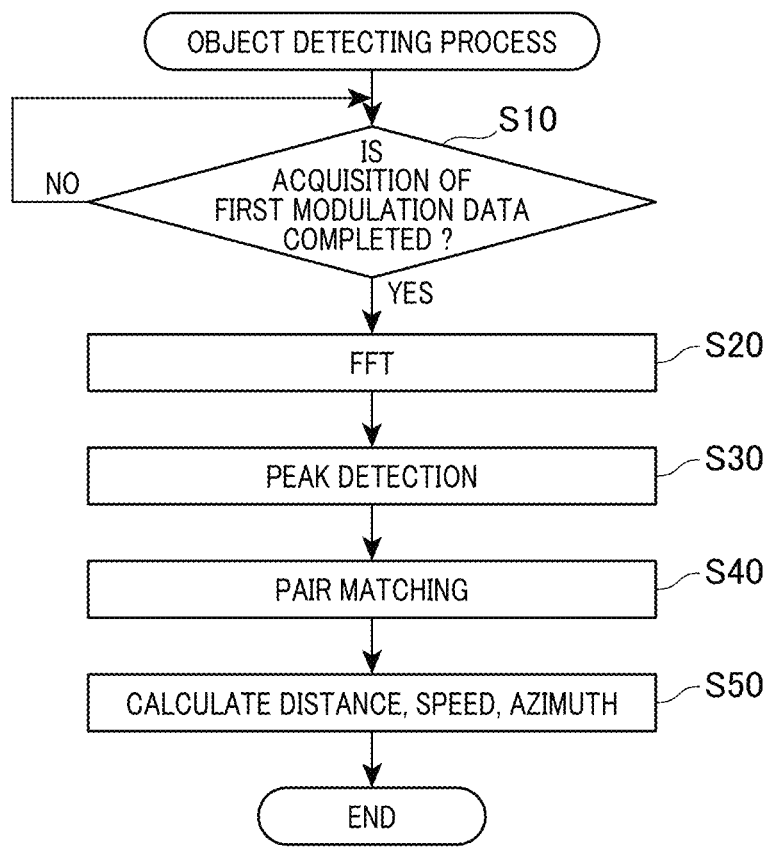
FIG. 3 is a flowchart showing an object detecting process of a first modulation data.

When executing the object detection process, as shown in FIG. 3, the processing unit 60 determines, at step S10, whether the first modulation data (i.e. beat signal of up-down chirp) has been acquired. Here, when the first modulation data has not been acquired, the processing unit 60 repeats executing the process of S10 to wait for the completion of acquisition of the first modulation data. In FIG. 2, only one pair of the up-down chirp indicated by triangle shape is generated, but two or more pairs of the plurality of up-down chirp signals may be generated.

Then, when acquisition of the first modulation data has been completed, the processing unit 60 executes, at step S20, the FFT process (i.e. frequency analyzing process) on the first modulation data for each antenna element 41 and at an up chirp period and a down chirp period, thereby generating a power spectrum. The power spectrum indicates the power of reflected waves for each frequency component.

Further, the processing unit 60 calculates, at step S30, an average power spectrum in which the power spectrum is averaged at each up-chirp period and each down-chirp period, and extracts a peak which exceeds a peak detection threshold of which the power is set in advance.

Then, the processing unit 60 executes a pair matching process that pairs peaks in the up-chirp period and the down-chirp period which are produced in accordance with reflected waves from the same object. Since the pair matching process is a well-known technique and various specific methods are present, the explanation thereof is omitted here.

The processing unit 60 calculates, at S50, a distance, a relative speed and an azimuth for each object, thereby generating the detection values (R, V, θ). Hereinafter, the detection values (R, V, θ) generated at S50 are referred to as first detection values (R, V, θ).

Specifically, the processing unit 60 firstly calculates, based on the frequencies of peaks combined through the pair matching process, the distance and the relative speed for each object by using the known method of up-down chirp radar. Further, the processing unit 60 calculates, for each object, an azimuth identified by the peak frequencies, in accordance with a phase difference between signal components having the same peak frequency acquired from the plurality of antenna elements 41 in the reception antenna 40 for two peaks combined through the pair matching process.

Figure 4:
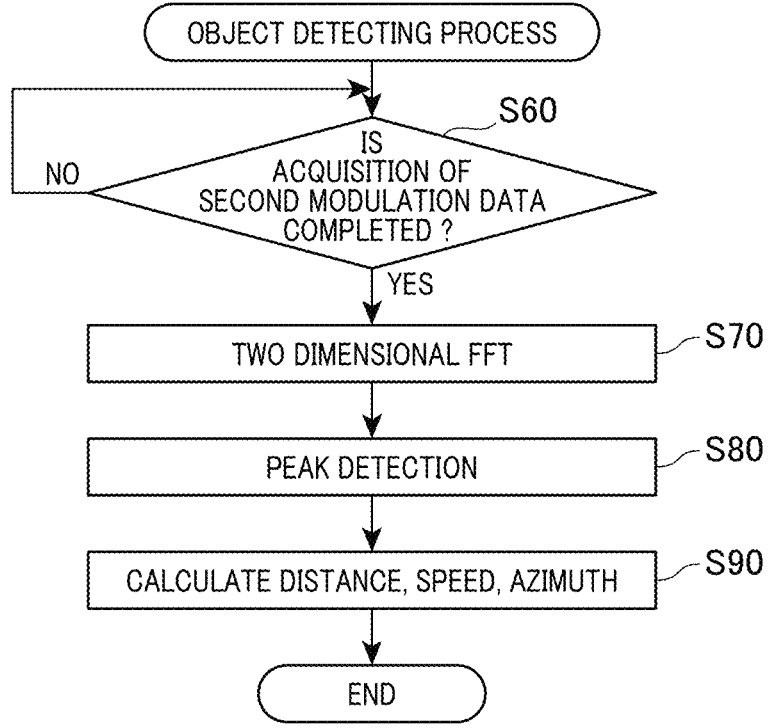
FIG. 4 is a flowchart showing an object detecting process of a second modulation data.

The processing unit 60 performs the object detecting process of the second modulation data shown in FIG. 4 in parallel to the object detecting process of the first modulation data shown in FIG. 3. The processing unit 60 determines, at S60, whether the acquisition of the second modulation data has been completed. When the acquisition of the second modulation data has not been completed, the processing unit 60 repeats executing the process at S60 to wait the completion of acquisition of the second modulation data.

Then, when the acquisition of the second modulation data has completed, the processing unit 60 executes a two-dimensional FFT to the second modulation data. Specifically, as shown in FIG. 4, the processing unit 60 executes the first FFT process at each of the received plurality of chirp signals, thereby generating the power spectrum. Next, the processing unit 60 executes the second FFT process to the frequency data having the same FFT power spectrum in the plurality of FFT power spectrums. Note that, the frequencies of the beat signals detected in the respective chirp periods in accordance with reflected waves from the same object are the same. However, in the case where the object and the own vehicle have a relative speed, the phase of the beat signal slightly changes depending on the received chirp signals. In other words, according to the result of the second FFT process, a power spectrum of which the frequency (i.e. relative speed) is the frequency component corresponding to a rotation speed of the above-described phase, is calculated for each frequency (i.e. distance) acquired as a result of the first FFT process. Hereinafter, the power spectrum is referred to as a two dimensional power spectrum.

As shown in FIG. 4, the processing unit 60 extracts peaks from the two dimensional power spectrum at S80. Further, the processing unit 60 calculates a distance, a relative speed and an azimuth for each object, thereby generating detection values (R, V, θ) for each object and terminates the object detection process. Hereinafter, the detection values (R, V, θ) generated at S90 are referred to as second detecting values.

Specifically, the processing unit 60 calculates a distance and a speed from a frequency which peaks in the two dimensional power spectrum for respective signals received by the plurality of reception antennas. Further, the processing unit 60 executes an azimuth detecting process such as a beam forming, using information of an amplitude and a phase of peaks extracted from respective signals received by the plurality of reception antennas, thereby calculating the azimuth. The calculated azimuth includes an angle in the horizontal direction and an angle in the vertical direction with respect to the center axis of the reception antenna 40.

Subsequently, a procedure of the axial displacement correction process executed by the processing unit 60 will be described. The axial displacement correction process is repeatedly executed at every measurement period Tm while the processing unit 60 is in operation.

Figure 5:
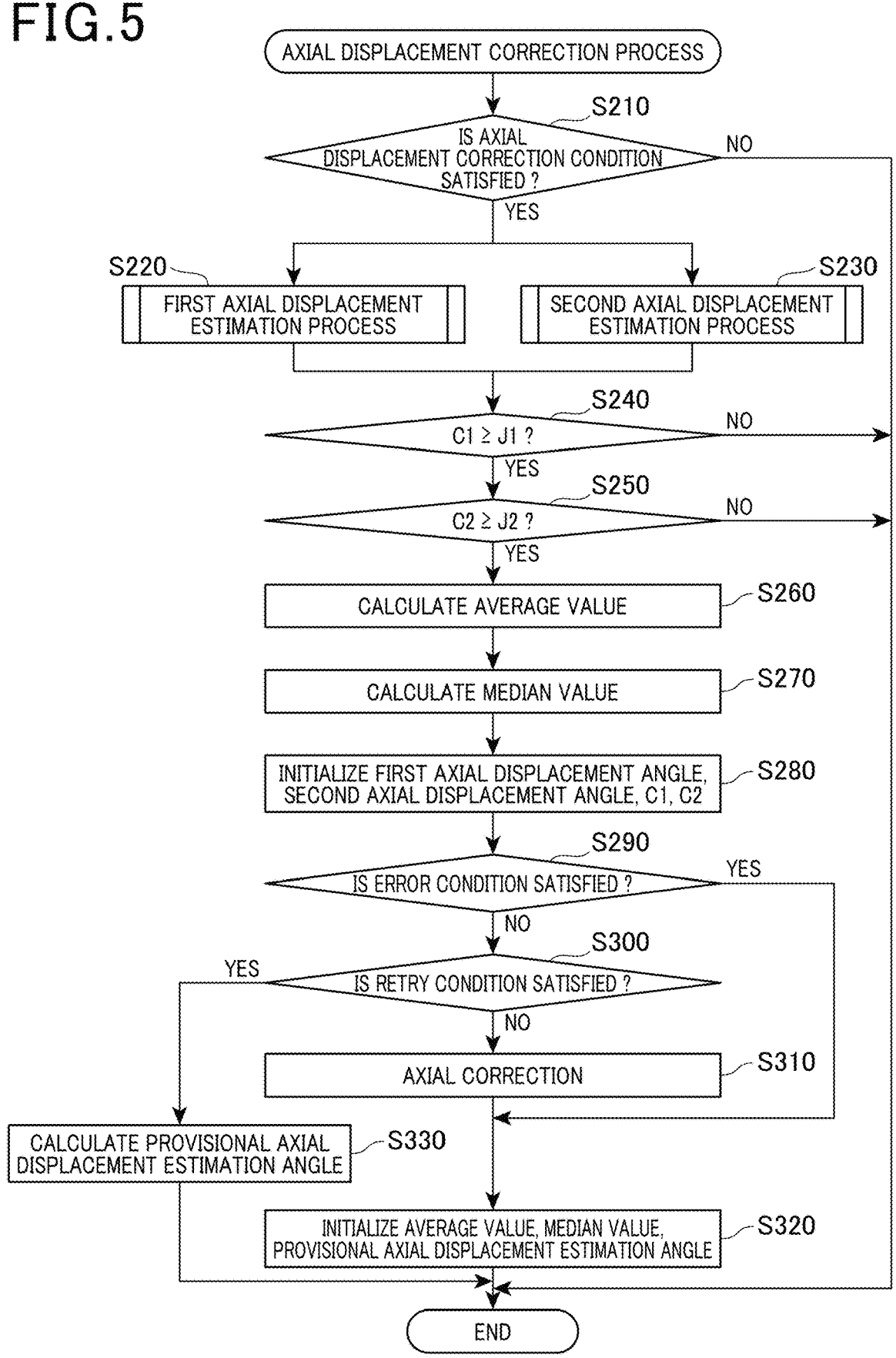
FIG. 5 is a flowchart showing an axial displacement correction process.

When the axial displacement correction process is executed, as shown in FIG. 5, the processing unit 60 determines whether a predetermined axial displacement correction condition is satisfied at S210. According to the present embodiment, the predetermined axial displacement correction condition refers to a condition where a vehicle speed or a yaw rate detected by the on-vehicle sensor group 2 satisfies a predetermined condition. Here, when the predetermined axial displacement correction condition is not satisfied, the processing unit 60 does not execute the axial displacement correction process in the current cycle.

On the other hand, when the predetermined axial displacement correction condition is satisfied, the processing unit 60 executes the first axial displacement estimation process in parallel to the second axial displacement estimation process S220.

Here, a procedure of the first axial displacement estimation process will be described.

Figure 6:
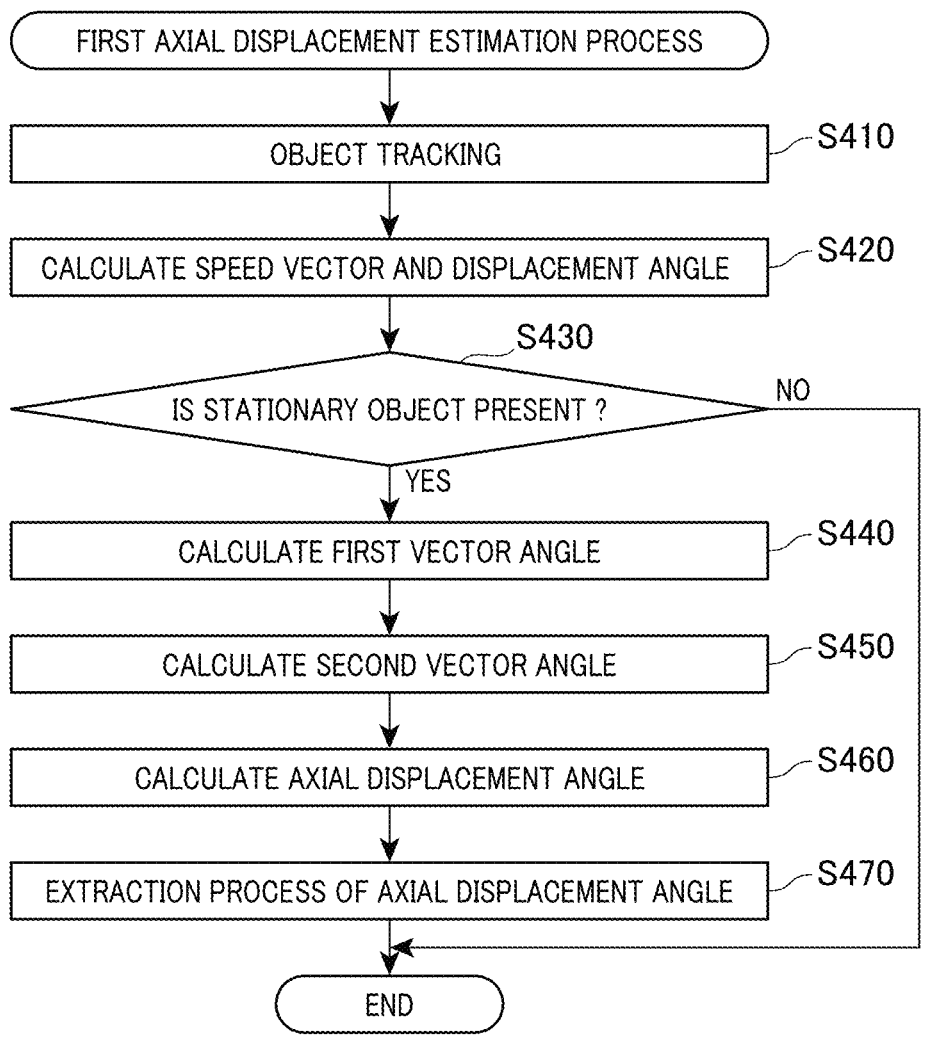
FIG. 6 is a flowchart showing a first axial displacement estimation process.

Once the first axial displacement estimation process is executed, as shown in FIG. 6, the process performs, at S410, an object tracking based on the first detection value generated at S50. Thus, a first measurement data is generated indicating a position (Sx, Sy) on an xy coordinate plane in front of the own vehicle and the relative speed vector Vz relative to the own vehicle for at least one stationary object in front of the own vehicle (See FIG. 7). Note that y axis on the xy coordinate plane is the center axis of the reception antenna 40. The x axis on the xy coordinate plane is an axis orthogonal to the center axis of the reception antenna 40.

Figure 7:
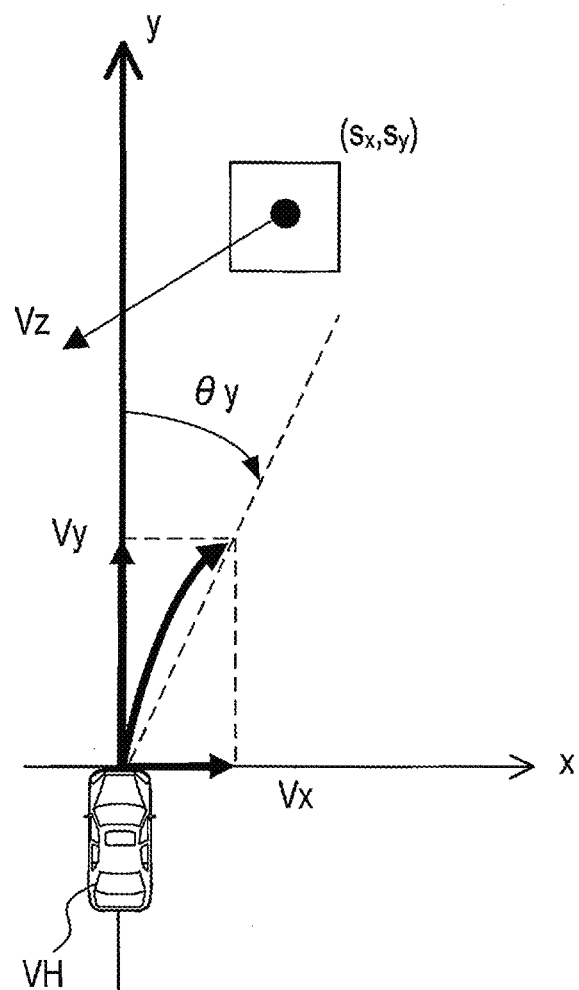
FIG. 7 is a diagram showing a speed vector of an own vehicle and a stationary object.

Next, at S420, the processing unit 60 calculates a speed vector (Vx, Vy) and a displacement angle $\theta_y$ based on odometry information acquired from the on-vehicle sensor group 2 (See FIG. 7).

Then, at S430, the processing unit 60 determines whether a stationary object is present among objects with which the object tracking is performed at S410. Specifically, the processing unit 60 compares the relative speed vector Vz of respective objects measured at S419 relative to the own vehicle with the speed vector (Vx, Vy) of the own vehicle calculated from the odometry information, thereby determining whether the respective objects are stationary object.

Here, when no stationary object is present, the processing unit 60 terminates the first axis displacement estimation process. On other hand, when a stationary object is present, the processing unit 60 calculates a first vector angle θb at S440.

Figure 8:
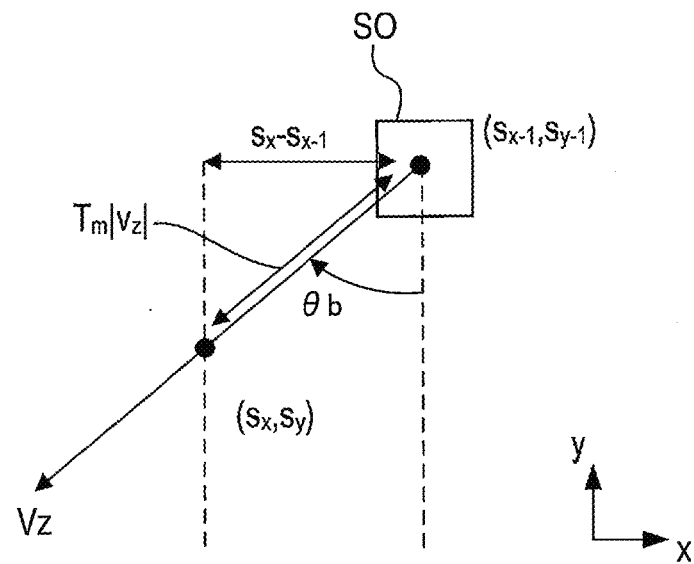
FIG. 8 is a diagram showing a vector angle.

As shown in FIG. 8, the first vector angle θb is a vector angle calculated from the position (Sx, Sy) of the stationary object on the XY coordinate plate in front of the own vehicle and the position (Sx-1, Sy-1) detected at a time which is a measurement period Tm prior to the current period and the relative speed vector Vz. The processing unit 60 calculates the first vector angle θb in accordance with the equation (1) below.

[Math 1]

$$\theta b = \sin^{-1}\left(\frac{S_x - S_{x-1}}{T_m |v_z|}\right) \quad (1)$$

Further, as shown in FIG. 6, the processing unit 60 performs an ego-motion that predicts the behavior of the own vehicle based on the odometry information at S450, thereby calculating the second vector angle θe. That is, the processing unit 60 utilizes the displacement angle $\theta_y$, the speed vector (Vx, Vy) and the position (Sx-1, Sy-1) of the stationary object detected at a time a measurement period Tm prior to the current period to calculate the estimation position (S'x, S'y) in accordance with the equation (2) below. Then, the processing unit 60 utilizes the positions (Sx-1, Sy-1) and (S'x, S'y) to calculates the second vector angle θe.

Figure 9:
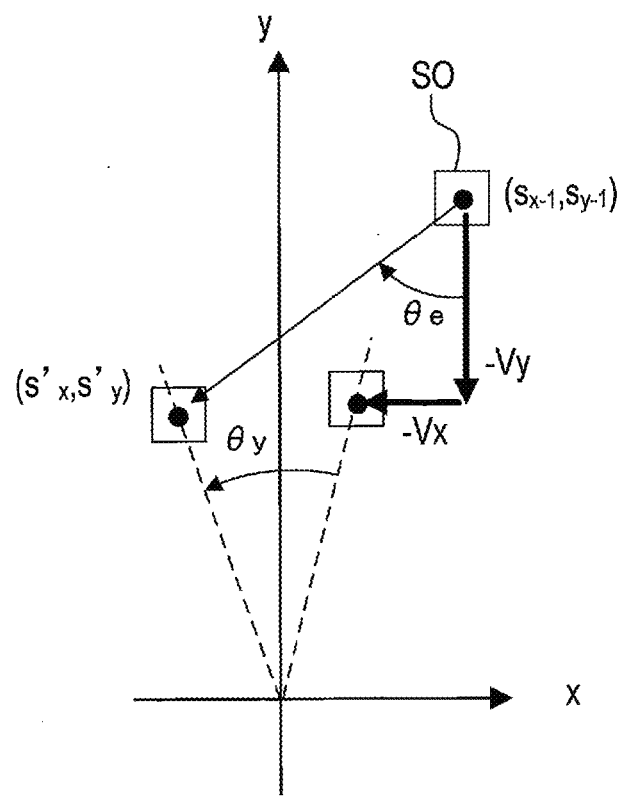
FIG. 9 is a diagram showing a vector angle.

As shown in FIG. 9, the second vector θe refers to an angle of a vector in which the start point is the position (Sx-1, Sy-1) of the stationary object detected at a time a measurement period Tm prior to the current period and the end point of the estimation position (S'x, S'y) of the vehicle. Hence, the processing unit 60 calculates the second vector angle θe in accordance with the equation (3) below.

[Math 2]

$$\begin{bmatrix} S'_x \\ S'_y \end{bmatrix} = \begin{bmatrix} \cos\theta_y & -\sin\theta_y \\ \sin\theta_y & \cos\theta_y \end{bmatrix} \begin{bmatrix} S_{x-1} + (-v_x) \\ S_{y-1} + (-v_y) \end{bmatrix} \quad (2)$$

$$\theta e = \tan^{-1}\left(\frac{S'_x - S_{x-1}}{S'_y - S_{y-1}}\right) \quad (3)$$

Then, as shown in FIG. 6, the processing unit 60 calculates, at S460, the axial displacement angle θgap in accordance with the equation (4) and proceeds to S470. Note that, the axial displacement angle θgap is calculated based on the measurement result of all of the stationary objects detected at S410. Specifically, in the case where the measurement result of m stationary objects at S410 is acquired, m axial displacement angles θgap are calculated by the processes of S440 to S460.

[Math 3]

$$\theta_{gap} = \theta b - \theta e \quad (4)$$

When the process proceeds to S470, the processing unit 60 executes an extraction process of the axial displacement angle. Specifically, the processing unit 60 extracts only the axial displacement angles θgap within a predetermined angle range. The M pieces of angle θ1gap thus extracted are stored into the RAM of the processing unit 60.

Further, the processing unit 60 stores a value, where M which is the number of extracted axial displacement angles is added to a value stored in the number of detections of axial displacement angle C1 provided in the RAM of the processing unit 60, into the number of detections of axial displacement angle C1.

[Math 4]

$$C1 = C1 + M \quad (5)$$

As shown in FIG. 5, the processing unit 60 executes the second axial displacement estimation process in parallel to the first axial displacement estimation process at S230.

Figure 10:
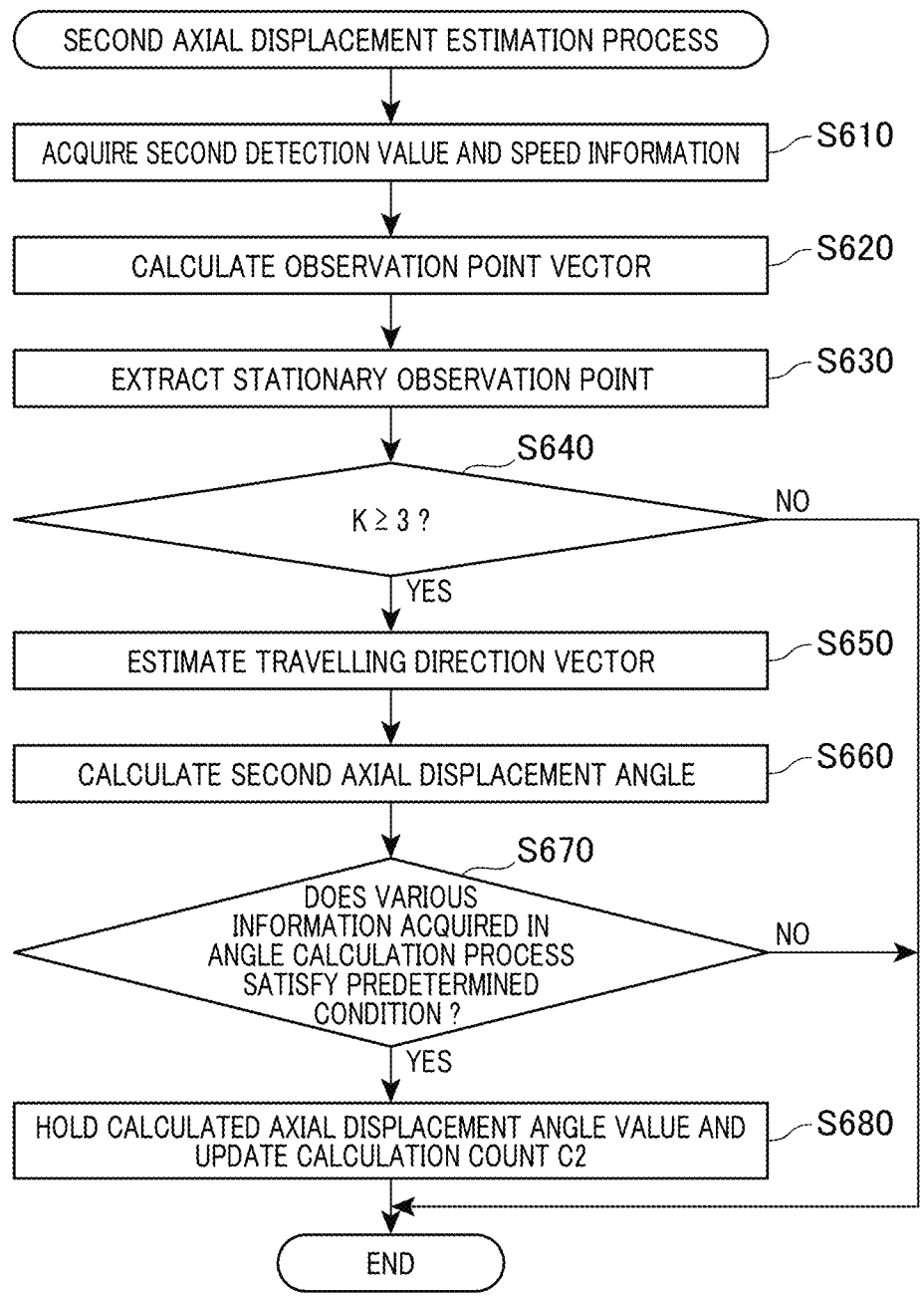
FIG. 10 is a flowchart showing a second axial displacement estimation process.

The second axial displacement process will be described. When the second axial displacement estimation process is executed, as shown in FIG. 10, the processing unit 60 acquires, at S610, the latest second detection value (R, V, θ) detected in accordance with the chirp wave group method, and the vehicle speed information from the on-vehicle sensor group 2. Hereinafter, a point identified based on the detection value is referred to as observation point.

Figure 11:
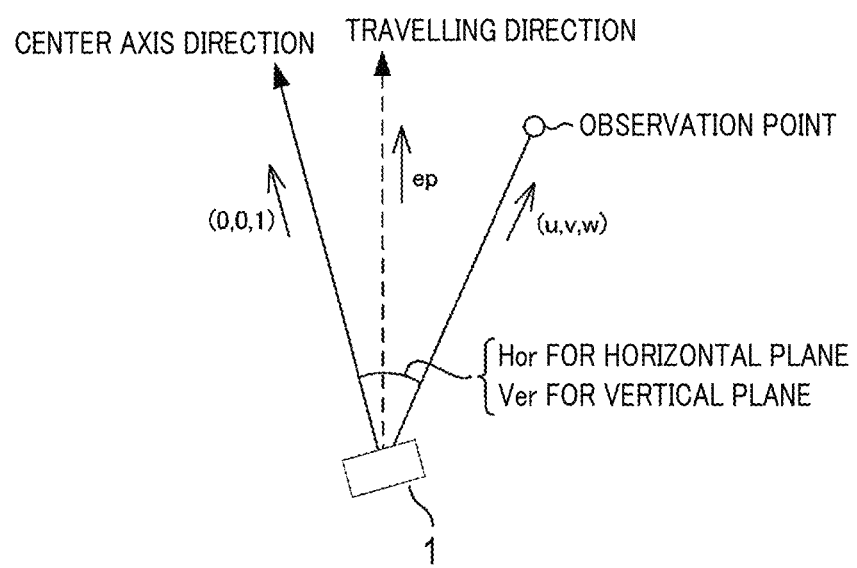
FIG. 11 is a diagram showing a relationship between a center axis direction of the radar apparatus, a traveling direction of a vehicle and a direction where an observation point is present.

The processing unit 60 executes, at S620, a coordinate conversion for respective observation points based on the second detection values acquired at S610. Specifically, as shown in FIG. 11, the processing unit 60 acquires, at S620, three-dimensional coordinate (u, v, w) in accordance with the equations (6), (7) and (8) below. The Hor in the equation (6) is a horizontal angle included in the second detecting value. The Ver in the equation (7) is a vertical angle included in the second detecting value.

[Math 5]

$$u = \sin(\text{Hor}) \quad (6)$$

$$v = \sin(\text{Ver}) \quad (7)$$

$$w = \sqrt{1 - u^2 - v^2} \quad (8)$$

The three-dimensional coordinate (u, v, w) indicates a horizontal distance u on the plane orthogonal the center axis, a vertical distance v on the plane original to the center axis and the distance w in the center axis direction, where the distance to the observation point is 1. The three-dimensional coordinate (u, v, w) is a unit vector (hereinafter referred to as observation point vector) indicating a direction where the observation point is present when viewed from the radar apparatus 1. In particular, the distance w indicates an amount of the relative speed in a direction indicated by the observation point vector which is actually detected by the radar apparatus 1, where the relative speed in the center axis direction is 1 when own vehicle and the observation point move in the same direction. Hereinafter, the distance w is also referred to as a Doppler attenuation factor.

Further, the processing unit 60 extracts an observation point corresponding to a stationary object (hereinafter referred to as stationary observation point) among the observation points identified from the second detection value acquired at S610. Specifically, the processing unit 60 utilizes the vehicle speed Cm indicated by the vehicle speed information acquired at S610 and extracts observation points that satisfies the equation (9) as the stationary observation points, where the relative speed included in the second detecting value is q and a predetermined threshold is ε. In other words, an observation point satisfying a condition where an absolute value of a ratio of the vehicle speed Cm to the relative speed q added to the Doppler attenuation factor w becomes smaller than the threshold ε, is the stationary observation point. At this time, the number of extracted stationary observation points is K.

[Math 6]

$$|q/Cm+w| < \varepsilon \quad (9)$$

In the case where the direction indicated by the observation point vector (u, v, w) of the stationary observation point match the center axis direction (0, 0, 1), (i.e. w=1), the vehicle speed Cm and the relative speed q of the observation point are the same, and the direction of the relative speed q is opposite to the own vehicle speed Cm. Hence, q/Cm=−1. In the case where the direction indicated by the observation point vector (u, v, w) of the stationary observation point does not match the center axis direction (i.e. w≠1), the relative speed q decreases at a rate depending on the Doppler attenuation factor q. Hence, q/Cm=−W In either case, the observation point where the left side of the equation (9) becomes 0 is considered to be a stationary observation point. However, the vehicle speed Cm acquired from the on-vehicle sensor group 2 does not match the actual vehicle speed due to slip of the wheels or the like. Further, when the center axis direction is shifted from the travelling direction of the own vehicle, the relative speed q detected by the radar apparatus 1 changes depending on an amount of the shift. Hence, even it is at the stationary observation point, the left side of the equation (9) is not necessarily 0. Therefore, threshold ε is appropriately set and utilized considering this influence.

Then, the processing unit 60 determines whether the number of extracted stationary observation points K is three or more. When the number of extracted stationary observation points is less than three, the processing unit 60 terminates the second axial displacement estimation process.

On the other hand, when the number of extracted stationary observation points K is three or more, the processing unit 60 estimates, at S650, the unit vector ep (hereinafter referred to as travelling direction vector) indicating the actual travelling direction of the own vehicle and the actual own vehicle speed Cp, using the equation (10) below. Note that the own vehicle speed Cp is scalar. Q in equation (10) is a column vector where the relative speed q of the K stationary observation points are sequentially arranged, and expressed with the equation (11). E in equation (10) is a matrix where the observation point vectors of the K stationary observation points expressed by a row vector are sequentially arranged in a column direction, and expressed with the equation (12). The travelling direction vector ep is a row vector where the horizontal component up, the vertical direction component vp and the beam direction component wp are arranged, and expressed with the equation (13). Note that the absolute value of ep is 1, i.e. |ep|=1.

[Math 7]

$$Q = E \cdot Cp \cdot ep \quad (10)$$

$$Q = \begin{bmatrix} q_1 \\ q_2 \\ \vdots \\ q_K \end{bmatrix} \quad (11)$$

$$E = \begin{bmatrix} u_1 & v_1 & w_1 \\ u_2 & v_2 & w_2 \\ \vdots & \vdots & \vdots \\ u_K & v_K & w_K \end{bmatrix} \quad (12)$$

$$ep = \begin{bmatrix} up \\ vp \\ wp \end{bmatrix} \quad (13)$$

That is, the equation (10) represents K simultaneous equations where the own vehicle speed Cp component and the travelling direction vector ep component are unknown parameters. The simultaneous equations are solved, thereby acquiring the own vehicle speed Cp and the travelling direction ep. The travelling direction vector ep is composed of three components, and one component can be calculated from other two components. Hence, the number of unknown parameters which should be calculated is total three including the own vehicle speed Cp. Accordingly, three or more stationary object observation points are required in order to solve the equation (10). Further, since specific solution of the simultaneous equations is common knowledge, the explanation thereof is omitted here. As an example, a least squares method can be utilized, but it is not limited thereto.

Figure 12:
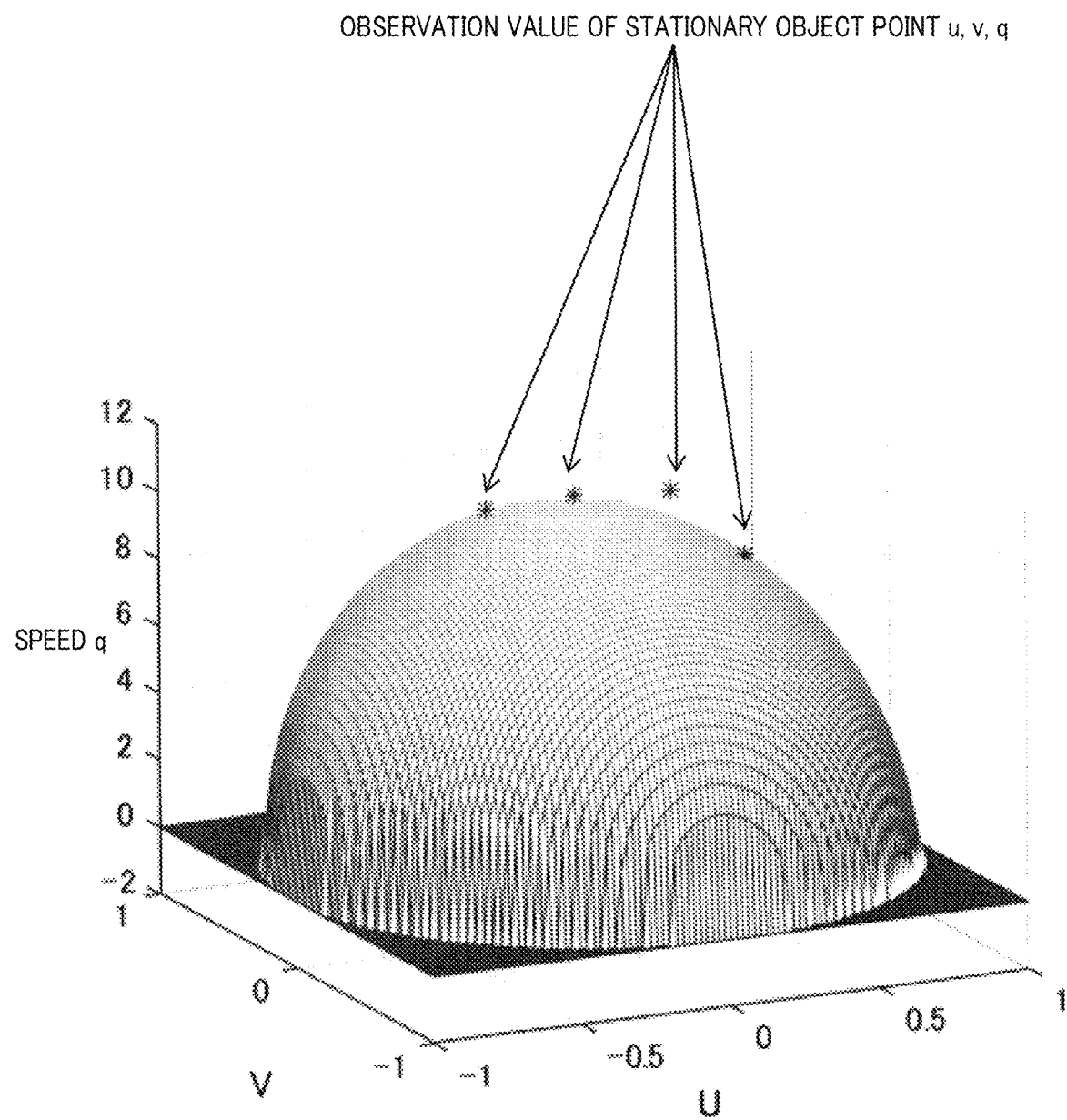
FIG. 12 is a graph showing an area where observation point vectors are present.

FIG. 12 is graph showing an area where the observation point vectors (u, v, w) are present (on a hemisphere in FIG. 12). For the w axis, the scale thereof is converted to indicate the relative speed q. Specifically, the scale is converted such that the vehicle speed Cm is set to be w=1. When the stationary observation points are plotted on the coordinate system shown in FIG. 12, if no axial displacement is present in the radar apparatus 1, and the center axis direction and the travelling direction are the same, the stationary observation points are plotted on the hemisphere. Solving the above-described simultaneous equations corresponds to acquisition of the travelling direction vector and the own vehicle speed where all of the stationary observation points are plotted on the hemisphere.

Next, at S660, the processing unit 60 calculates, based on the horizontal direction component up and the vertical direction component vp of the travelling direction vector ep estimated at S650, a second axial displacement angle in the horizontal direction θ2$h_{gap}$ (hereinafter referred to as second horizontal axis displacement angle θ2$h_{gap}$) and a second axial displacement angle in the vertical direction θ2$v_{gap}$ (hereinafter referred to as second vertical axis displacement angle θ2$v_{gap}$) in the center axis direction of the radar apparatus 1 with respect to the travelling direction of the own vehicle, by using equation (14) and equation (15).

Further, at S670, the processing unit 60 determines whether values of the second axis displacement angles θ2$h_{gap}$ and θ2$v_{gap}$ or various information acquired in the process of calculating the second axis displacement angle satisfy a predetermined condition, for example, whether θ2$h_{gap}$ is within a predetermined second horizontal extraction angle range.

When determined at S670 that the predetermined condition is satisfied, the processing unit 60 holds, at S680, the value of second horizontal axis displacement angle θ2$h_{gap}$ in the RAM of the processing unit 60, stores an addition value where 1 is added to a value stored in the second calculation count C2, into the second calculation count C2 and terminates the second axial displacement estimation process.

[Math 8]

$$\theta 2h_{gap} = \arcsin(up) \quad (14)$$

$$\theta 2v_{gap} = \arcsin(vp) \quad (15)$$

When the first axial displacement estimation process at S220 and the second axial displacement estimation process at S230 are terminated, as shown in FIG. 5, the processing unit 60 determines, at S240, whether the value stored in the first calculation count C1 is larger than or equal to a first correction determination count J1. Here, in the case where the value stored in the first calculation count C1 is less than the first correction determination count J1, the processing unit 60 terminates the axial displacement correction process of the current period.

On the other hand, when the value stored in the first calculation count C1 is larger than or equal to the first correction determination count J1, the processing unit 60 determines, at S250, whether the value stored in the second calculation count C2 is larger than or equal to the second correction determination count J2. When the value stored in the second calculation count C2 is less than the second correction determination count J2, the processing unit 60 terminates the axial displacement correction process of the current period. On the other hand, when the value stored in the second calculation count C2 is larger than or equal to the second correction determination count J2, the processing unit 60 calculates an average value of the first axial displacement angles $\theta 1_{gap}$ and an average value of the second horizontal axial displacement angles $\theta 2h_{gap}$.

The average value of the first calculation count C1 pieces of the first axial displacement angle $\theta 1_{gap}$ is referred to as a first axial displacement angle average value $\theta 1\_ave$.

The processing unit 60 determines the second calculation number C2 pieces of second horizontal axial displacement angle $\theta 2h_{gap}$ to be the second horizontal axial displacement angle average value $\theta 2h\_ave$.

Next, the processing unit 60 calculates, at S270, a median value of the first axial displacement angle $\theta 1_{gap}$. The median value is a value positioned at the center in the plurality of data arranged from lowest to highest. The first axial displacement angle $\theta 1_{gap}$ is referred to as a first axial displacement angle mesial value $\theta 1\_med$.

Further, at S280, the processing unit 60 initializes the RAM region of the processing unit 60, where the first calculation count C1 pieces of first axial displacement angle $\theta 1_{gap}$ and the second calculation count C2 pieces of second axial displacement angle $\theta 2h_{gap}$ are stored, to initialize the values stored in the first calculation count C1 and the second calculation count C2 to be 0.

Then, the processing unit 60 determines whether a predetermined error condition is satisfied at S290. The predetermined error condition according to the present embodiment is to determine whether the axial displacement is excessively large, or whether the axial estimation result is apparently abnormal. The predetermined error condition is satisfied when at least one of the following first error determination condition and second error determination condition is satisfied.

The first error determination condition is satisfied when the absolute value of the first axial displacement angle average value $\theta 1\_ave$ is larger than or equal to a predetermined first error determination angle.

The second error determination condition is satisfied when an absolute value of a difference between the first axial displacement angle average value $\theta 1\_ave$ and the second horizontal axial displacement angle average value $\theta 2h\_ave$ is larger than or equal to the predetermined second error determination angle.

In the case where the error condition is satisfied, the processing unit 60 proceeds to S320, initializes the average value calculated at S260, the median value calculated at S270 and a provisional axial displacement estimation angle $\theta'\_est$ and terminates the axial displacement correction process in the current period. On the other hand, when the error condition is not satisfied, the processing unit 60 determines whether a predetermined retry condition is satisfied at S300. The retry condition according to the present embodiment is to determine whether errors of the first axial displacement angle average value $\theta 1\_ave$ and the second horizontal axial displacement angle average value $\theta 2h\_ave$ with respect to an axial displacement true value is within an allowable range. The retry condition according to the present embodiment is satisfied when at least one of the following first retry determination condition, a second retry determination condition and a third retry determination condition is satisfied.

The first retry determination condition is satisfied when the absolute value of the first axial displacement angle average value $\theta 1\_ave$ is larger than or equal to the predetermined first retry determination angle. According to the present embodiment, the first retry determination angle is set to be smaller than the first error determination angle.

The second retry determination condition is satisfied when the absolute value of the second horizontal axial displacement angle average value $\theta 2h\_ave$ is larger than or equal to the predetermined second retry determination angle.

The third retry determination condition is satisfied when an absolute value of a difference between the first axial displacement angle average value $\theta 1\_ave$ and the first axial displacement angle median value $\theta 1\_med$ is larger than or equal to the predetermined third retry determination angle.

Figure 13:
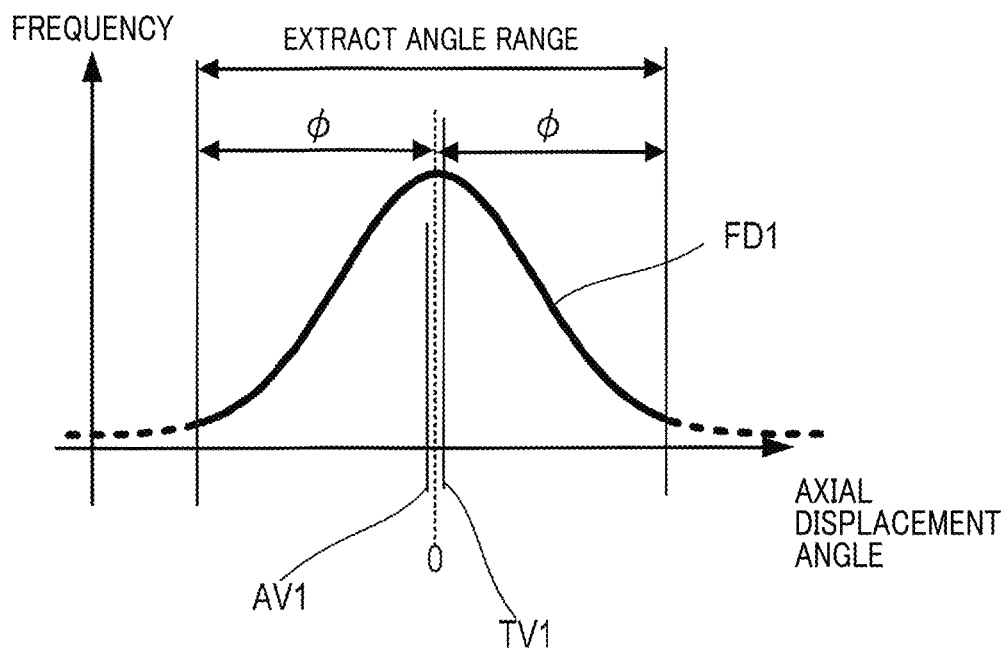
FIG. 13 is a graph showing a frequency distribution of the axial displacement angle in the case where the average value and the true value are substantially the same.

As shown in FIG. 13, when the true value TV1 of the axial displacement is small (i.e. axial displacement amount is small), a frequency distribution FD1 of the axial displacement angle extracted within an extraction angle range which is set from $-\varphi[°]$ to $+\varphi[°]$ is symmetrical, and the average value AV1 of the axial displacement angles is substantially the same as the true value TV1 of the axial displacement angle.

Figure 14:
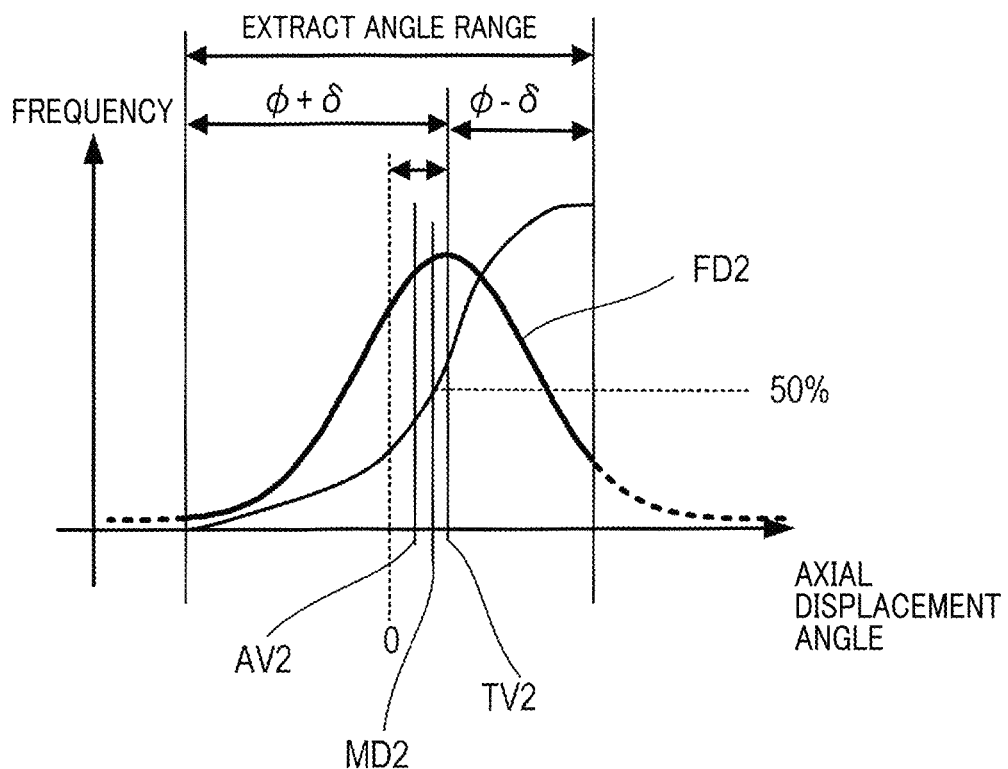
FIG. 14 is a graph showing a frequency distribution of the axial displacement angle in the case where a large difference is present between the average value and the true value.

As shown in FIG. 14, when the true value TV2 of the axial displacement angle is large (i.e. axial displacement amount is large), a frequency distribution FD2 of the axial displacement angle extracted within the extraction angle range which is set from $-\varphi[°]$ to $+\varphi[°]$ is asymmetrical, and the difference between the average value AV2 of the axial displacement angles and the median value MD2 of a plurality of axial displacement angles becomes large.

Figure 15:
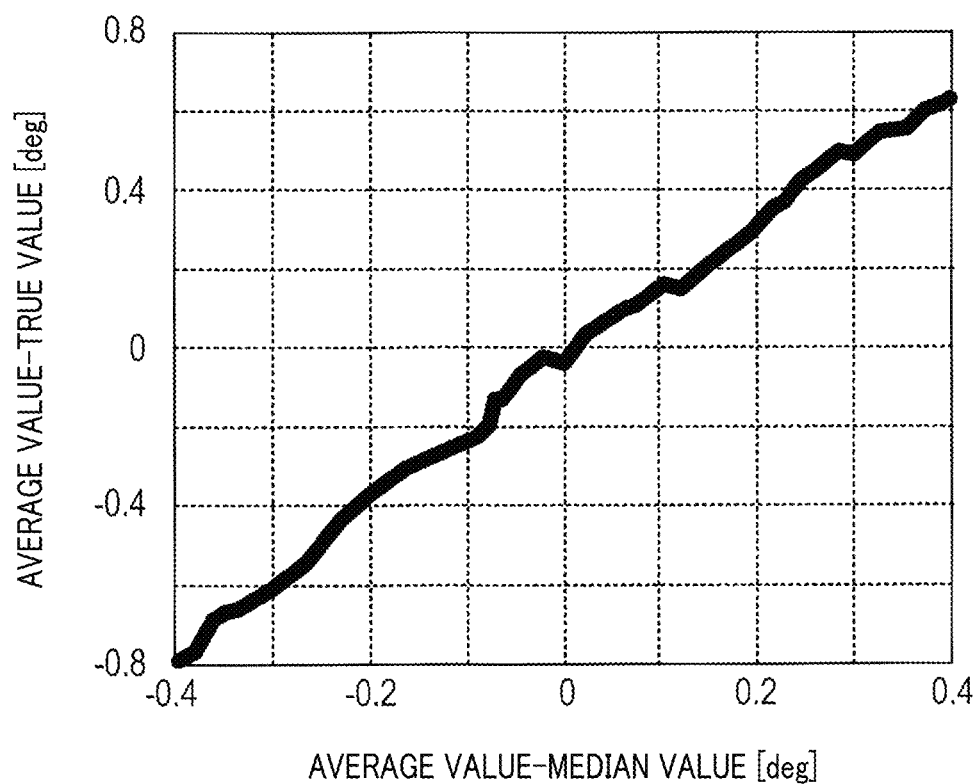
FIG. 15 is graph showing a relationship between a subtract value where a median value is subtracted from the average value and a subtract value where a true value is subtracted from the average value.

As shown in FIG. 15, a subtract value where the median value of the axial displacement angle is subtracted from the average value of the axial displacement angles has a positive correlation with a subtract value where the true value of the axial displacement angle is subtracted from the average value of the axial displacement angles.

As shown in FIG. 15, the third retry determination condition is set based on a fact that the larger the difference between the average value of the axial displacement angle and the median value of the axial displacement angle, the larger the difference between the true value of the axial displacement angle and the average value of the axial displacement angles is.

Figure 16:
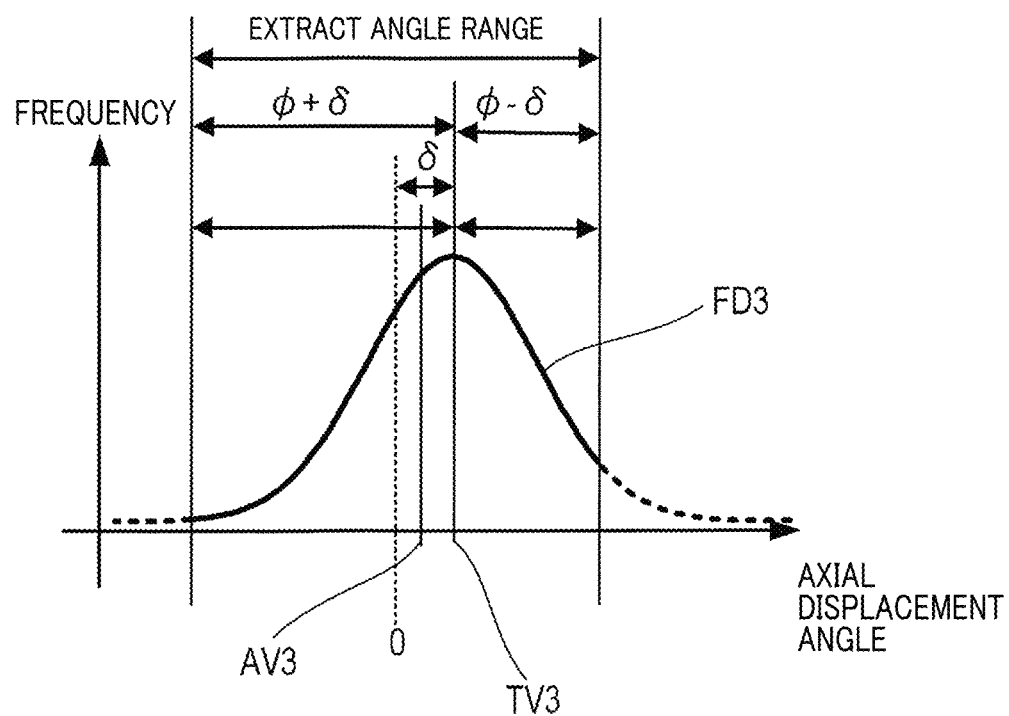
FIG. 16 is a diagram showing a frequency distribution of the axial displacement angle in the case where the axial displacement is large.

As shown in FIG. 16, when the true value TV3 of the axial displacement angle is δ (i.e. axial displacement amount is large), a frequency distribution FD3 of the axial displacement angle extracted within the extraction angle range which is set from −φ[°] to +φ[°] is asymmetrical, and the difference between the average value AV3 of a plurality of the axial displacement angles and the true value TV3 of the axial displacement angle becomes large.

Figure 17:
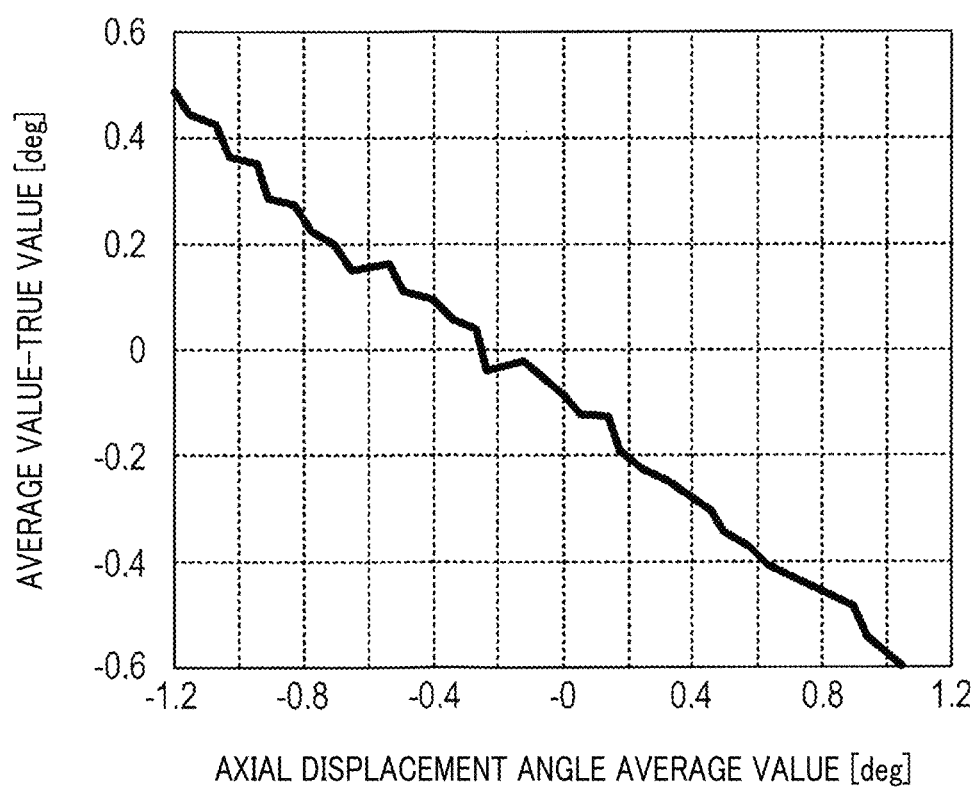
FIG. 17 is a graph showing a relationship between the average value and a subtract value where the true value is subtracted from the average value.

As shown in FIG. 17, the average value of the axial displacement angle has a negative correlation with a subtract value where the true value of the axial displacement angle is subtracted from the average value of the axial displacement angles.

As shown in FIG. 17, the first retry determination condition and the second retry determination condition are set based on a fact that the larger the average value of the axial displacement angle, the larger the difference between the average value of the axial displacement angle and the true value of the axial displacement angle.

Here, when the retry condition is satisfied, as shown in FIG. 5, the processing unit 60 proceeds to S330, stores the first axial displacement angle average value θ1_ave into the RAM as a provisional axial displacement estimation angle θ'_est, and sets the processes of S50 and S60 such that the center axis of the reception antenna 40 is assumed to be shifted by the provisional axial displacement estimation angle θ'_est in a generation process of the first detection value at S50 and a generation process of the second detection value at S90, thereby performing the calculation. Hereinafter, the retry condition is satisfied again, the process calculates the provisional axial displacement estimation angle θ'_est by adding the first axial displacement angle average value θ1_ave to the provisional axial displacement estimation angle θ'_est.

On the other hand, when the retry condition is not satisfied, the processing unit 60 performs an axial correction at S310. Specifically, the processing unit 60 stores the first axial displacement angle average value θ1_ave into the RAM as an axial displacement estimation angle θ_est, and sets the processes of S50 and S60 such that the center axis of the reception antenna 40 is assumed to be shifted by the axial displacement estimation angle θ_est in a generation process of the first detection value at S50 and a generation process of the second detection value at S90, thereby performing the calculation. In the case where the provisional axial displacement estimation angle θ'_est is set at S330, the process stores a value in which the provisional axial displacement estimation angle θ'_est is added to the first axial displacement angle average value θ1_ave into the RAM as an axial displacement estimation angle θ_est.

When the process of axial correction at S310 is completed, the processing unit 60 initializes, at S320, the average value calculated at S260, the median value calculated at S270 and θ'_est calculated at S330, and terminates the axial displacement correction process.

The processing unit 60 this configured utilizes two detection values acquired with two modulation methods and estimates the axial displacement angle for each two modulation methods. Note that the radar apparatus 1 transmits a plurality types of radar waves modulated with two different modulation methods and receives the radar waves reflected at objects for two types of radar waves of which the modulation methods are mutually different, and detects the position and relative speed of the stationary objects that reflected the radar waves, thereby generating the detection values of the objects. The two modulation methods are the up-down chirp radar method and the chirp wave group radar method.

Further, the processing unit 60 determines, based on the two axial displacement angle estimation results estimated using the two detection values corresponding to respective two modulation methods, determines whether a predetermined allowable condition is met. The allowable condition is a condition where the above-described error condition and the retry condition are not satisfied.

Then, the processing unit 60 utilizes the axial displacement angle estimation result which is estimated using the up-down chirp radar method when determined that the allowable condition is met.

Thus, the processing unit 60 is able to estimate the axial displacement angle based on the detection result of only a single radar apparatus 1 using mutually different two modulation methods. Hence, since the processing unit 60 does not necessarily utilize, when estimating the axial displacement angle using two modulation methods, the detection result of an apparatus other than the radar apparatus 1, configuration of the apparatus for estimating the axial displacement can be simplified.

When determined that the allowable condition is not met because the error condition is satisfied, the processing unit 60 does not utilize the axial displacement angle estimation result and terminates the estimation of the axial displacement angle. Further, the processing unit 60, when determined that no allowable condition is met because the retry condition is satisfied, stores the axial displacement angle estimation result into the RAM as the provisional axial displacement estimation angle, and again executes the estimation of the axial displacement angle, assuming that the axis is displaced by the calculated axial displacement estimation angle.

Thus, the processing unit 60 suppresses an unfavorable event where the axial displacement angle estimation result having low estimation accuracy is utilized, thereby improving the estimation accuracy.

The modulation method of the up-down chirp radar method is used for a long distance measurement to generate radar waves for detecting objects in a farther location with respect to the own vehicle than the location of objects in which the chirp wave group radar method detects. The modulation method of the chirp wave group radar method is used for short distance measurement to generate radar waves for detecting objects in a closer location with respect to the own vehicle than the location of objects in which the up-down chirp radar method detects.

Thus, the processing unit 60 is able to estimate the axial displacement angle based on detection values of mutually different objects between the axial displacement estimation using the up-down chirp radar method and the axial displacement estimation using the chirp wave group radar method. Since the axial displacement angle is estimated based on detection values of mutually different objects, in the case where the estimation accuracy of the axial displacement angle estimation is deteriorated using one modulation method, the estimation angle estimation using the other modulation method may not be deteriorated. In other words, causes for deterioration of the axial displacement angle estimation may be different between on modulation method and the other modulation method.

Hence, even in the case where an accuracy of the axial displacement angle estimation using one modulation method is deteriorated, the processing unit 60 compares the axial displacement angle estimation result using one modulation method with the axial displacement angle estimation result using the other modulation method where the estimation accuracy is not deteriorated, whereby deterioration of the estimation accuracy can be determined to avoid utilizing the angle estimation result having low estimation accuracy.

According to the above-described embodiments, the processing unit 60 corresponds to an axial displacement estimation device, steps of S220 and S230 correspond to processes as an estimation unit, steps of S290 and S300 correspond to a utilization determination unit and a rejection unit, and step S310 corresponds to a utilization unit.

One embodiment of the present disclosure is described. The present disclosure is not limited to the above-described embodiments, but may be modified in various ways.

(Modification 1)

For example, according to the above-described embodiments, embodiment using two modification methods is exemplified, but three or more modification methods may be used.

(Modification 2)

According to the above-described embodiment, one axial displacement estimation result is used in two axis displacement angle estimation results, but two axial displacement angle estimation results may be used. For example, an average of two axis displacement angle estimation results can be used.

The processing unit 60 and method thereof disclosed in the present disclosure may be accomplished by a dedicated computer constituted of a processor and a memory programmed to execute one or more functions embodied by computer programs. Alternatively, the processing unit 60 and method thereof disclosed in the present disclosure may be accomplished by a dedicated computer provided by a processor configured of one or more dedicated hardware logic circuits. Further, the processing unit 60 and method thereof disclosed in the present disclosure may be accomplished by one or more dedicated computer where a processor and a memory programmed to execute one or more functions, and a processor configured of one or more hardware logic circuits are combined. Furthermore, the computer programs may be stored, as instruction codes executed by the computer, into a computer readable non-transitory tangible recording media. A method for achieving respective functions included in the processing unit 60 does not necessarily include software, and all of functions may be accomplished by one or more hardware units.

Multiple functions of a single component in the above-described embodiment may be implemented by multiple components, and a single function of a single component may be implemented by multiple components. Moreover, multiple functions of multiple components may be implemented by a single component, and a single function implemented by multiple components may be implemented by a single component. Further, some of the configurations of the above-described embodiment may be omitted. In addition, at least some of the configurations of the above-described embodiment may be added to or replaced with the configurations of the other embodiments described above.

The present disclosure can be achieved by various modes such as a system having the radar apparatus 1 as a constituent other than the above-described radar apparatus 1, a program causing the radar apparatus 1 to function as a computer, a non-transitory substantial recording media such as semiconductor memory, an axial displacement estimation method and the like.

CONCLUSION

The present disclosure simplifies configuration of a device for estimating an axial displacement. One aspect of the present disclosure is an axial displacement device that estimates an axial displacement angle of a radar apparatus mounted on a mobile body, including an estimation unit, a utilization determination unit and a utilization unit.

The radar apparatus is configured to transmit a plurality of radar waves modulated by mutually different plurality of modulation methods, receive the radar waves reflected at an object for each of the plurality of radar waves having mutually different modulation methods, detect at least one of a position and a relative speed of the object that reflected the radar waves, thereby generating detection values of the object for each of the plurality of modulation methods.

The estimation unit is configured to estimate an axial displacement angle for each of the plurality of modulation methods, using a plurality of the detection values acquired by mutually different plurality of the modulation methods.

The utilization determination unit is configured to determine whether a predetermined allowable condition is met based on a plurality of axial displacement angle estimation results estimated by the estimation unit using a plurality of detection values corresponding to respective plurality of modulation methods.

The utilization unit is configured to utilize at least one of the plurality of axial displacement angle estimation results when the utilization determination unit determines that the predetermined allowable condition is met.

The axial displacement estimation device of the present disclosure thus configured is able to estimate the axial displacement angle based on the detection result of on radar apparatus using mutually different modulation methods. Hence, the axial displacement estimation device of the present disclosure does not need to use detection result of an apparatus other than one radar apparatus so that configuration of an apparatus for estimating the axial displacement can be simplified.

What is claimed is:

1. An axial displacement estimation device that estimates an axial displacement angle of a radar apparatus mounted on a mobile body, the radar apparatus being configured to transmit a plurality of radar waves modulated by mutually different plurality of modulation methods, receive the radar waves reflected at an object for each of the plurality of radar waves having mutually different modulation methods, detect at least one of a position and a relative speed of the object that reflected the radar waves, thereby generating detection values of the object for each of the plurality of modulation methods, the axial displacement estimation device comprising:

an estimation unit configured to estimate the axial displacement angle for each of the plurality of modulation methods, using a plurality of the detection values acquired by mutually different plurality of the modulation methods;

a utilization determination unit configured to determine whether a predetermined allowable condition is met based on a plurality of axial displacement angle estimation results estimated by the estimation unit using a plurality of detection values corresponding to respective plurality of modulation methods; and a utilization unit configured to utilize at least one of the plurality of axial displacement angle estimation results when the utilization determination unit determines that the predetermined allowable condition is met.

2. The axial displacement estimation device according to claim 1, wherein
the axial displacement estimation device is provided with a rejection unit configured not to utilize the plurality of axial displacement estimation results estimated by the estimation unit when the utilization determination unit determines that no allowable condition is met, and to again execute an estimation of the axial displacement angle by the estimation unit or terminate the estimation.

3. The axial displacement estimation device according to claim 1, wherein
a first modulation method is determined as one modulation method in the plurality of modulation methods and a second modulation method is determined as one modulation method different from the first modulation method in the plurality of modulation methods;
the first modulation method generates the radar waves for detecting the object existing in a farther location with respect to the mobile body than a location of an object detected with the second modulation method; and
the second modulation method generates the radar waves for detecting the object existing in a closer location with respect to the mobile body than a location of an object detected with the first modulation method.

* * * * *